L. H. AND A. F. LOGAN.
HITCH.
APPLICATION FILED JULY 28, 1919.
1,341,918.
Patented June 1, 1920.
2 SHEETS—SHEET 1.
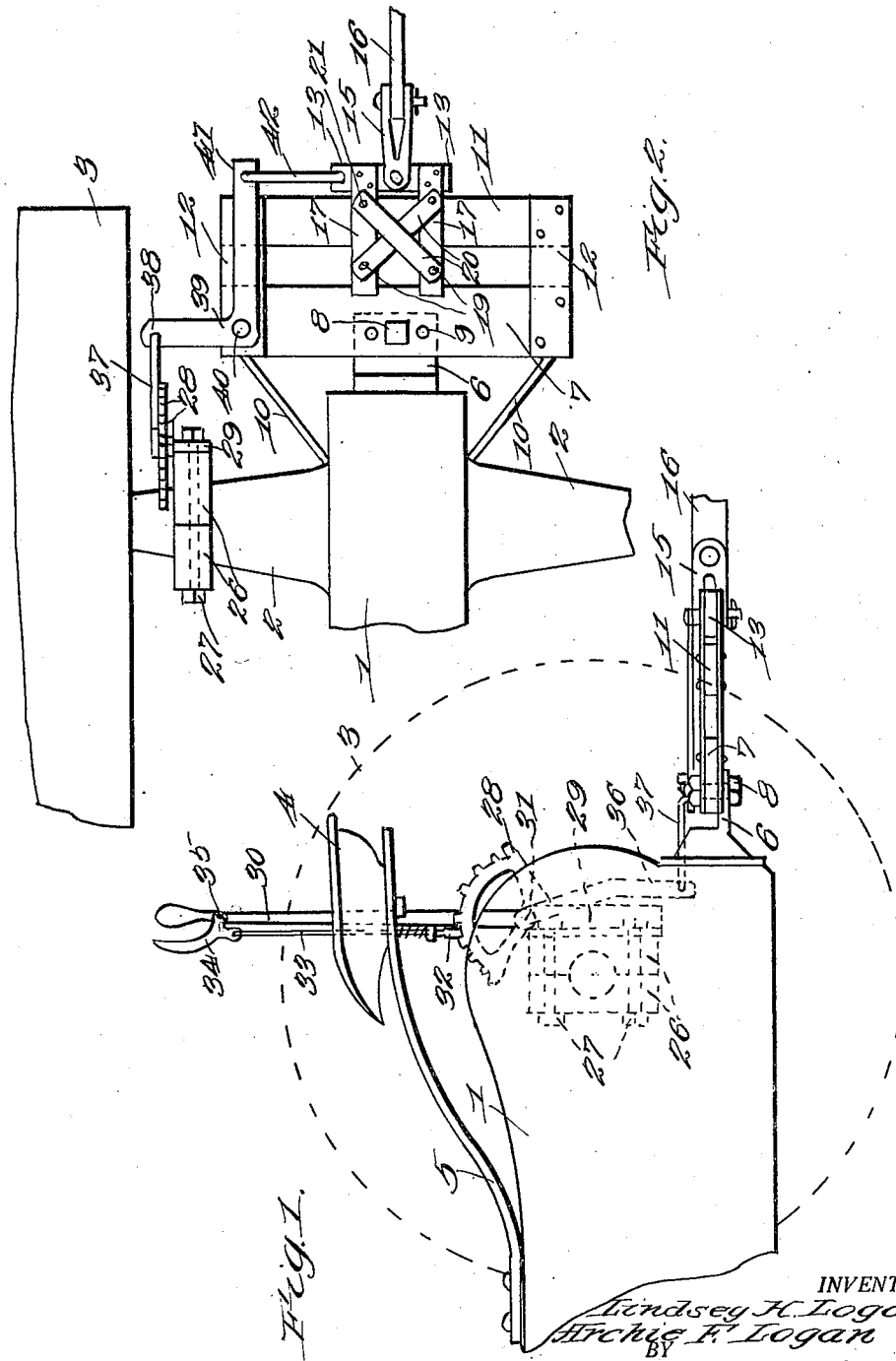
INVENTORS
Lindsey H. Logan
Archie F. Logan
BY
Carl M. Crawford
ATTORNEYS.

L. H. AND A. F. LOGAN.
HITCH.
APPLICATION FILED JULY 28, 1919.

1,341,918.

Patented June 1, 1920.
2 SHEETS—SHEET 2.

INVENTORS:-
Lindsey H. Logan
Archie F. Logan
BY
Carl N. Crawford
ATTORNEY

UNITED STATES PATENT OFFICE.

LINDSEY H. LOGAN AND ARCHIE F. LOGAN, OF SPOKANE, WASHINGTON.

HITCH.

1,341,918.   Specification of Letters Patent.   Patented June 1, 1920.

Application filed July 28, 1919. Serial No. 313,714.

*To all whom it may concern:*

Be it known that we, LINDSEY H. LOGAN and ARCHIE F. LOGAN, citizens of the United States, residing at Spokane, in the county of Spokane and State of Washington, have invented new and useful Improvements in Hitches, of which the following is a specification.

The object of this invention is to provide an improved hitch for connecting various kinds of agricultural implements to a tractor.

Heretofore, it has been necessary for the driver or operator to dismount from the tractor in order to change or adjust the application of draft. Because of this fact, utility of tractors has been greatly restricted in the application thereof to ground cultivation in orchards, such as harrowing, and furthermore, the efficiency of tractors in plowing on side hills has been greatly cut down because of the fact that the plows cant or shift away from the landside thereby greatly reducing the width of the furrow. Obviously, on a changing topography it is desirable to continually adjust the operation of the draft as the ground changes and it is clearly impossible for the operator of the tractor to stop the latter and dismount every time that it is desirable to shift the application of draft.

In accordance with our invention there is not only a very wide range of draft adjustment, as a result of our improved hitch, but the adjustment may be readily made and repeatedly changed by the tractor driver without necessitating either stopping the tractor or dismounting from the seat.

In accordance with our preferred construction, our improved hitch comprises a rigid rectangular frame of elongated formation, the frame being adapted for attachment to the drawbar of the tractor, and preferably to a body portion thereof, in a manner to hold the frame against shifting movement from its working position. A draft carriage is slidably mounted on said frame and is adapted for clevis attachment to the agricultural implement or other vehicle to be drawn. An operating lever device is adapted for attachment to a portion of the tractor and is operatively connected with the draft carriage so that the latter may be readily shifted into any lateral position within the range afforded to the hitch.

Our invention includes many other features which will be more fully described in connection with the accompanying drawings, and will be more particularly pointed out in and by the appended claims.

In the drawings:—

Figure 1, is a view in side elevation of the rear end of a Fordson tractor showing the application of our improved hitch thereto.

Fig. 2, is a plan view thereof.

Like characters of reference designate similar parts throughout the different figures of the drawings.

Figure 3:
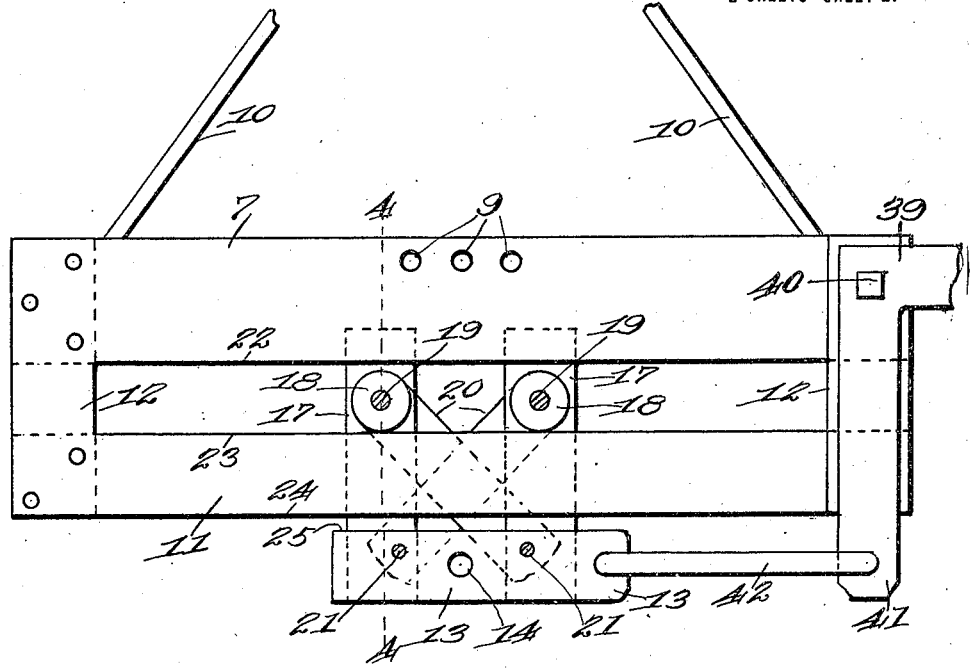
Fig. 3, is an enlarged plan view with portions of the draft carriage omitted to more clearly illustrate the construction.
Figure 4:
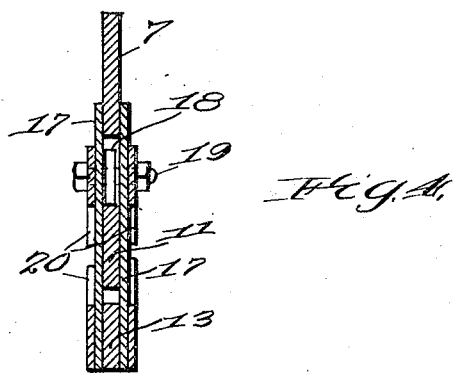
Fig. 4, is a sectional view on line 4—4 of Fig. 3.

As illustrated, 1 designates the rear portion of a tractor, the rear axle casing being designated at 2 and one of the rear driving wheels being shown at 3. The driver's seat is indicated at 4, the same being mounted upon a spring support 5. Projecting from the rear end of the body 1 is a drawbar 6. The foregoing sufficiently illustrates enough of the tractor to show the application of our invention thereto.

Our improved hitch comprises an elongated rectangular frame of preferably rigid construction. Said frame includes a drawbar member 7 having its longitudinal axis extending transversely to the line of draft and adapted to be applied upon the drawbar 6. On the Fordson tractor the drawbar is provided with three holes although in the present application we employ a single bolt 8 adapted to extend through the central hole. However, if desired, three bolt holes 9 may be employed to rigidly connect the drawbar member 7 with the drawbar 6. However, we preferably employ converging stay-bolts 10, connected with the hitch frame and with the body of the tractor in such a manner that in their co-action with bolt 8 they will not only securely hold the hitch frame in the position shown but they will additionally serve to distribute the strain on the member 7 so as not to localize the stresses to an area adjacent the drawbar. One of the essential features of the invention is to maintain the hitch frame against appreciable movement out of the position shown in Fig. 2 and while we have shown the preferred construction for making this character of attachment, we do not wish to be limited thereto as the device of our invention is primarily an attachment and therefore slight variations may be necessary in its application to different types of tractors.

Said hitch frame also includes a carriage bar member 11 which is disposed in parallel relation with the member 7. Said members 7 and 11 are shown rigidly connected by end frame members 12 to form a rigid frame structure.

Reference will next be made to an improved draft carriage which is adjustable on our improved hitch frame.

As illustrated, said carriage is in the form of a skeleton frame including a clevis or draft bar 13, which is parallel with carriage bar 11 and which is provided with an opening 14 for attachment thereto of a clevis 15, the latter being connected with the plow beam 16. Said draft bar 13 is preferably the same thickness as bar 11. A pair of retaining members 17 is attached to each face of the bar 13 and said retaining members 17 engage both faces of the bars 11 and 7 thereby serving to hold the draft bar in the plane of the hitch frame. The draft carriage is provided with means for engagement with the carriage bar 11 so that the application of draft is subjected to the latter. In order to reduce friction, we interpose rollers 18, the same being mounted upon bolts 19. In order to stiffen the carriage and also to prevent localizing draft strain on the retaining members 17, we employ tension strips 20 which are disposed in crossed relation, one pair on each side of the carriage, the bolts 19 serving as an anchorage for one set of ends and rivets 21 securing the remaining ends to the draft bar 13. These tension strips 20 being in crossed relation, serve effectively to retain the retaining members 17 from spreading and therefore the carriage presents a very rigid structure.

It is a feature of this invention to eliminate friction as much as possible irrespective of the direction in which the tractor is moving. Thus in accordance with our construction, either in going forward or in backing up the carriage rollers 18 will always be active.

This we accomplish by employing rollers 18 having a relatively limited play between the running surfaces or edges 22 and 23. The extent of play, as clearly shown in Fig. 3, is sufficiently reduced compared to the space between the edge 24 of the bar 11 and the edge 25 of draft bar 13 so that the rollers 18 will prevent the draft bar 13 from engaging bar 11. Thus we provide for all the desired clearance and relatively loose fit necessary in a mechanism of this character and at the same time localize all the friction on the rollers 18 excepting for the friction of the retaining members 17 in holding the carriage in the plane of the hitch frame.

A lever device is shown attached to one of the axle housings 2, and we have illustrated blocks 26 held in embraced relation about the housing by bolts 27. A notch segment member 28 is secured by said bolts 27 through a flange 29. A lever 30 is pivoted to the segment member at 31 and is provided with a spring actuated lug 32 adapted for engagement with said notches. A rod 33 connected with a hand grip 34, pivoted at 35 to said lever 30, provides means for actuating said spring actuated lug 32. Thus from Fig. 1, it will be seen that the lever 30 is in convenient access to the rider of the seat 4 and in view of the anti-friction draft carriage it will be obvious that the rider can readily adjust the latter by shifting the lever 30 without dismounting from his seat. The lever 30 has a lower end 36 which is connected by a link 37 with one end 38 of a bell crank lever 39. This lever 39 is pivoted at 40 on the hitch frame and carried thereby. The remaining arm 41, of said lever, is connected by a link 42 with the draft bar 13 at a point in line with the clevis opening 14. Now by means of this arrangement, the adjusting thrust is applied laterally of the rollers 18 and in such close proximity to the draft of the plow as to impart no binding action on the carriage when the latter is shifted along the carriage bar 11. It is believed that the manner of operation will now be clear and need not be recapitulated.

From Fig. 2, it will be clear that our improved hitch provides for an extremely wide range of draft adjustment which is more than ample to overcome the side draft of a plow or plows and cause the same to be retained sufficiently toward the land side to cut a full swath. The excessive range of adjustment is even capable of directing a harrow around the trees of an orchard so that the land can be completely cultivated throughout its entire area.

While we have herein shown one specific form of our invention, we do not wish to be limited thereto except for such limitations as the claims may impart.

We claim:—

1. A hitch mechanism comprising in combination, a hitch frame having a drawbar member extending transversely of the line of draft for connection with the drawbar of a tractor, a track member extending parallel with said drawbar member and in spaced relation thereto, end frame members rigidly connected with said drawbar and track members to form a rigid hitch frame, a draft carriage slidable laterally of the line of draft on said track member for connection with the implement to be drawn, a carriage adjusting lever device for application to the tractor, a bell crank lever pivoted on said hitch frame, and links connecting said bell crank lever with said carriage and lever device whereby said carriage may be shifted laterally of said frame to vary the line of draft with respect to the drawbar of the tractor.

2. A hitch mechanism comprising in combination, a hitch frame having a drawbar member for connection with the drawbar of a tractor, a track member extending parallel with said drawbar member and in spaced relation thereto, said track and drawbar members being rigidly connected, a draft carriage comprising a skeleton frame including a draft bar movable parallel with and abreast with the outside edge of said carriage member, the frame portions of said carriage extending on opposite sides of said track and drawbar members to hold the carriage in the plane of said frame, said frame having rollers journaled therein between said track and drawbar members and said rollers being of a diameter to engage either of said members dependent upon the direction of movement of said tractor and hold the draft bar free from said track bar.

3. A hitch mechanism comprising in combination, a hitch frame having a drawbar member for connection with the drawbar of a tractor, a track member extending parallel with said drawbar member and in spaced relation thereto, said track and drawbar members being rigidly connected, a draft carriage comprising retaining members extending on opposite sides of said hitch frame, a draft bar rigidly connected with said retaining members abreast of the outside edge of said track bar, rollers journaled in said retaining members for engagement with either of said track or draw bar members, and tension strips in crossed relation and united with said retaining members.

In testimony that we claim the foregoing as our own, we hereby affix our signatures.

LINDSEY H. LOGAN.
ARCHIE F. LOGAN.